US010223644B2

United States Patent
Gadde et al.

(10) Patent No.: US 10,223,644 B2
(45) Date of Patent: Mar. 5, 2019

(54) BEHAVIORAL MODELING OF A DATA CENTER UTILIZING HUMAN KNOWLEDGE TO ENHANCE A MACHINE LEARNING ALGORITHM

(71) Applicant: Cisco Technology, Inc., San Jose, CA (US)

(72) Inventors: Venkata Ramana Rao Gadde, Santa Clara, CA (US); Rao Cherukuri, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 492 days.

(21) Appl. No.: 14/499,270

(22) Filed: Sep. 29, 2014

(65) Prior Publication Data

US 2016/0092787 A1 Mar. 31, 2016

(51) Int. Cl.
G06N 99/00 (2019.01)
G06N 5/02 (2006.01)

(52) U.S. Cl.
CPC ............ *G06N 99/005* (2013.01); *G06N 5/02* (2013.01)

(58) Field of Classification Search
None
See application file for complete search history.

(56) References Cited

U.S. PATENT DOCUMENTS

| 8,458,074 B2 | 6/2013 | Showalter |
| 8,682,812 B1 | 3/2014 | Ranjan |
| 2006/0085854 A1 | 4/2006 | Agrawal et al. |
| 2012/0137367 A1 | 5/2012 | Dupont et al. |
| 2012/0323853 A1 | 12/2012 | Fries et al. |
| 2013/0108264 A1* | 5/2013 | deRuijter ............. H04Q 3/0083 398/45 |
| 2014/0165207 A1 | 6/2014 | Engel et al. |
| 2014/0222745 A1* | 8/2014 | Deng ..................... G06N 7/005 706/47 |

FOREIGN PATENT DOCUMENTS

CN 103150454 A 6/2013

OTHER PUBLICATIONS

Liang et al. "Anomaly Detection using Improved Hierarchy Clustering", ICAICI, 2009, pp. 319-323.*

* cited by examiner

*Primary Examiner* — Li Wu Chang
(74) *Attorney, Agent, or Firm* — Parker Ibrahim & Berg LLP; James M. Behmke; Stephen D. LeBarron

(57) ABSTRACT

A method generates a behavioral model of a data center when a machine learning algorithm is applied. A team of human modelers that partition the data center into a plurality of connected nodes is analyzed by a behavioral model. The behavioral model of the data center detects an anomaly in a system behavior center by recursively applying the behavioral model to each node and simple component. A compressed metric vector for the node is generated by reducing a dimension of an input metric vector. A root cause of a failure caused is determined by the anomaly and an action is automatically recommended to an operator to resolve a problem caused by the failure. The proactively actions are taken to keep the data center in a normal state based on the behavioral model using the machine learning algorithm.

7 Claims, 11 Drawing Sheets

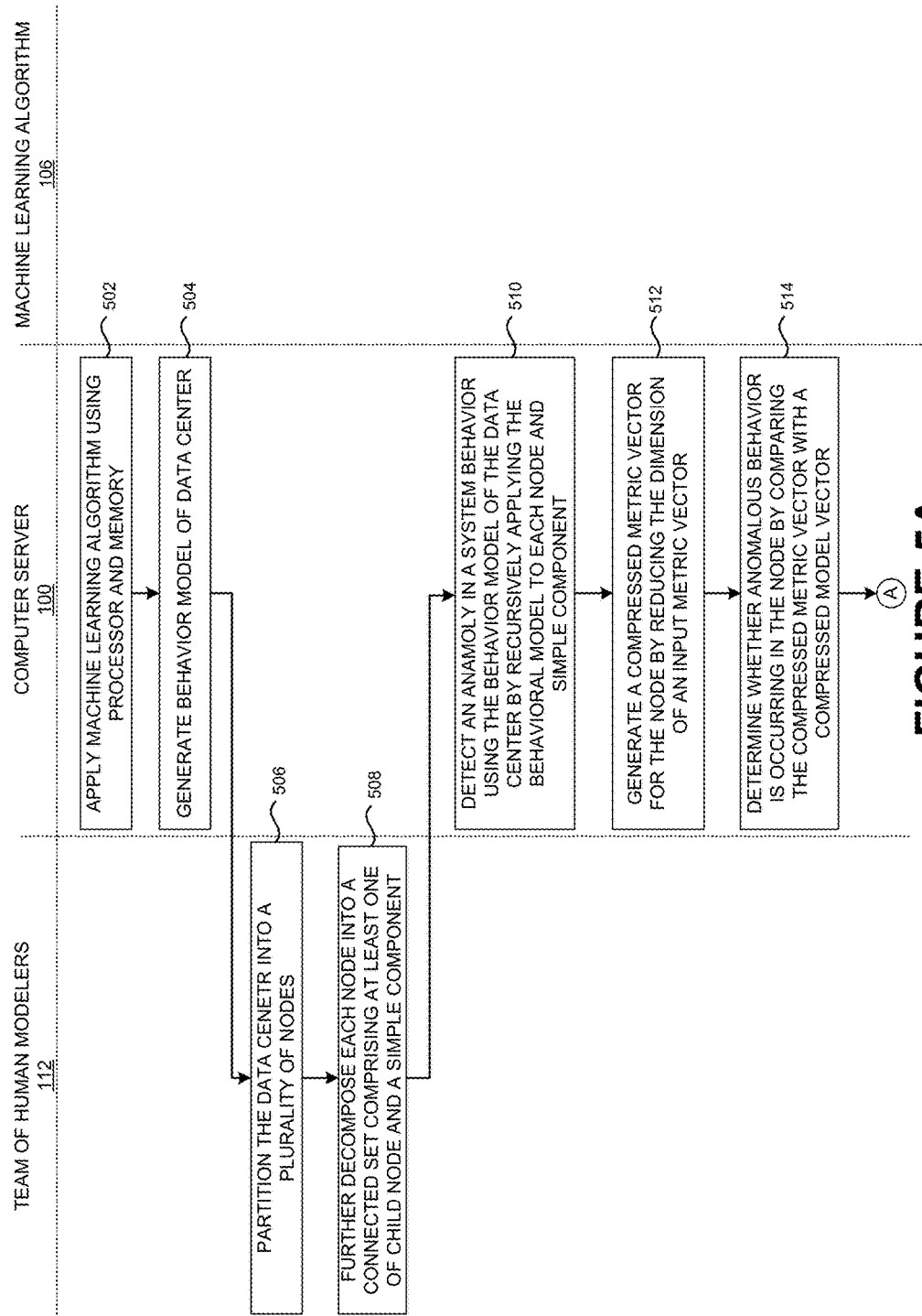

BEHAVIORAL MODELING OF A DATA CENTER UTILIZING HUMAN KNOWLEDGE TO ENHANCE A MACHINE LEARNING ALGORITHM

FIELD OF TECHNOLOGY

This disclosure relates generally to data center modeling, more particularly, to behavioral modeling of a data center utilizing human knowledge to enhance a machine learning algorithm.

BACKGROUND

A data center may be a facility used to house computer systems and/or associated components, such as telecommunications and storage systems. It may include redundant and/or backup power supplies, redundant data communications connections, environmental controls (e.g., air conditioning, fire suppression) and/or various security devices. A data center may have millions of features and components upon which the data center is formed.

For example, the data center may have a large number of virtual machines running on each physical server in the data center. Furthermore, the data center may rapidly change when new interconnections are formed and/or components are added, deleted, and/or modified. Therefore, modeling an entire system of a data center may be a computationally restrictive task. Therefore, visibility into root causes of failure conditions in the data center may be time intensive, manual, and laborious.

SUMMARY

Disclosed are a method, a device and/or a system of behavioral modeling of a data center utilizing human knowledge to enhance a machine learning algorithm.

In one aspect, a method includes a server to generate a behavioral model of a data center when a machine learning algorithm is applied using a processor and a memory. The behavioral model is structured based on analysis of a team of human modelers that partition the data center into a plurality of connected nodes. The team of human modelers decomposes each node into a connected set of child node and/or a simple component. The child node is a subset of another node and the simple component is a node which has not been further decomposed. The behavioral model of the data center detects an anomaly in a system behavior by recursively applying the behavioral model to each node and simple component, for each node to generate a compressed metric vector for the node by reducing a dimension of an input metric vector. The input metric vector includes a metric for the node and/or the compressed metric vector from the child node.

The server determines an anomalous behavior occurring in the node by comparing the compressed metric vector with a compressed model vector. The compressed model vector of the node is a compressed metric vector generated using the metric associated with the node operating non-anomalously and/or the compressed model vector of child node. The method determines a root cause of a failure caused by the anomaly and automatically recommends an action to an operator to resolve a problem caused by the failure. The data center is kept in a normal state by taking proactively actions based on the behavioral model using the machine learning algorithm.

The team of human modelers may identify characteristic including a label, a type, a category, and/or a connection of each of the nodes. The group each of the nodes having similar characteristics in the server may be defined by the team of human modelers. The machine learning algorithm may improve the behavioral model based on a human knowledge applied in real time as the input by the team of human modelers. The dimension of the input metric vector may be reduced using a principal component analysis and/or a neural network.

A full system model of the data center may be automatically updated based on a dynamic change detected from a creation, destruction, and/or a modification of an interconnection and/or a flow in the data center based on a reapplication of the human knowledge to further enhance the machine learning algorithm. The full system model of the data center may be automatically updated based on the dynamic change detected when the node is added, deleted, and/or moved in the data center.

In another aspect, a method generates a behavioral model of a data center when a machine learning algorithm is applied using a processor and a memory. The behavioral model is trained based on a human knowledge deconstruction of the data center into a set of connected simplified components. The method detects an anomaly in a system behavior based on the behavioral model of the data center. The data center is kept in a normal state by taking proactively actions based on the behavioral model using the machine learning algorithm.

The behavioral model may be generated based on an analysis of a team of human modelers that decompose a complex system of the data center into a connected system of smaller constituent subsystems. The smaller constituent subsystems may be further decomposed by the team of human modelers into the set of connected simple components. The metric of each of the smaller constituent subsystems may be compressed in a recursive fashion to ultimately build a full system model of the data center at a point in time.

In yet another aspect, a system of a machine learning environment includes a computer server of the machine learning environment. The computer server includes one or more computers having instructions stored thereon that when executed cause the one or more computers to generate a behavioral model of a data center when a machine learning algorithm is applied using a processor and a memory. The behavioral model is trained based on a human knowledge deconstruction of the data center into a set of connected simplified components. The system detects an anomaly in a system behavior based on the behavioral model of the data center and determines a root cause of a failure caused by the anomaly. An operator automatically recommends an action to resolve a problem caused by the failure. The data center is kept in a normal state by taking proactively actions based on the behavioral model using the machine learning algorithm.

The methods and systems disclosed herein may be implemented in any means for achieving various aspects, and may be executed in a form of a non-transitory machine-readable medium embodying a set of instructions that, when executed by a machine, cause the machine to perform any of the operations disclosed herein.

Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which:

FIG. 5A is a critical path view of generating a behavioral model of a data center when a machine learning algorithm is applied to the computer server of FIG. 1 using a processor and a memory, according to one embodiment.

Figure 1:
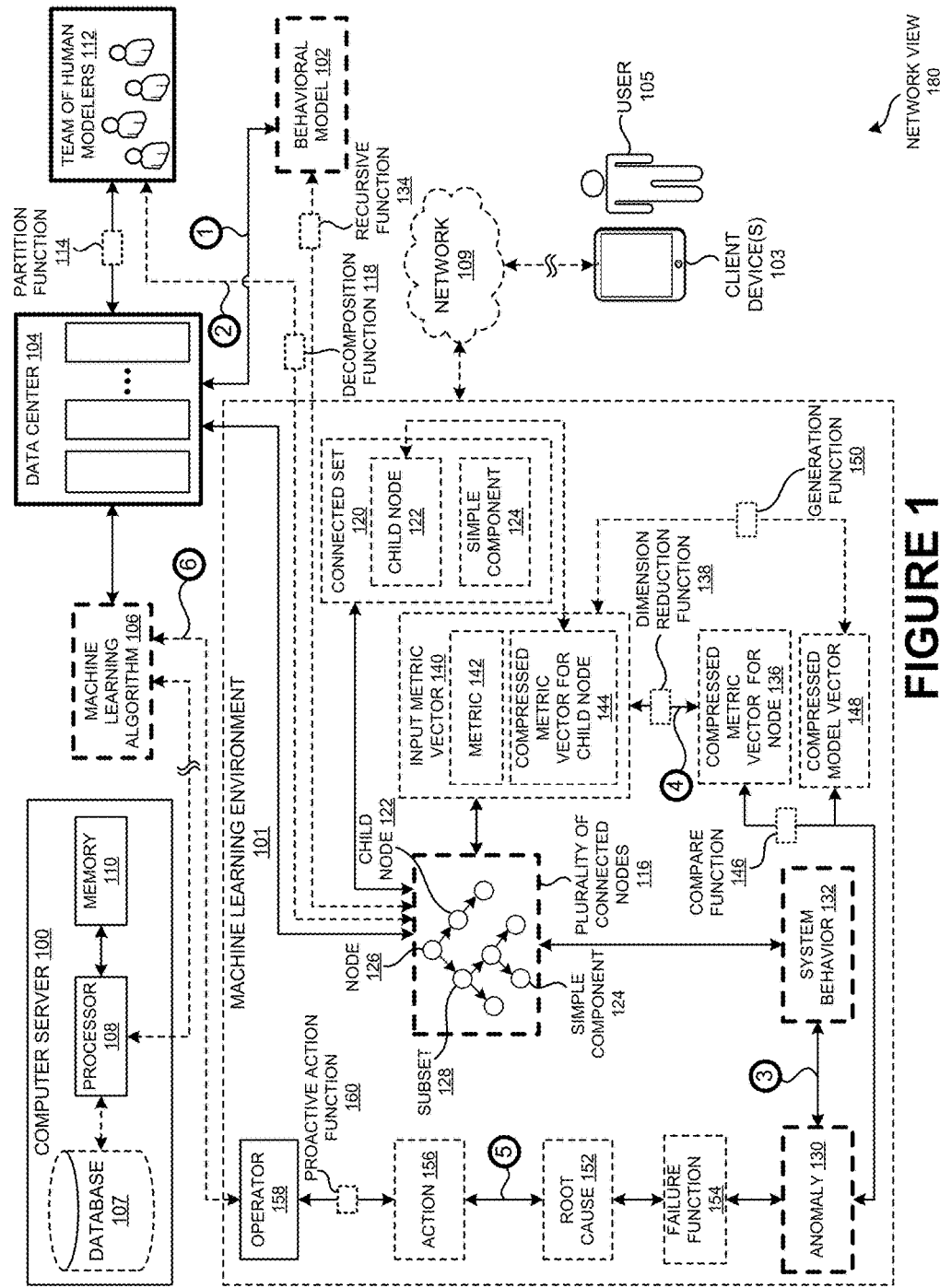
FIG. 1 is a network view of generating a behavioral model of a data center when a machine learning algorithm is applied using a processor and a memory, according to one embodiment.

Other features of the present embodiments will be apparent from the accompanying drawings and from the detailed description that follows.

DETAILED DESCRIPTION

Example embodiments, as described below, may be used to provide a method, a device and/or a system of behavioral modeling of a data center utilizing human knowledge to enhance a machine learning algorithm. Although the present embodiments have been described with reference to specific example embodiments, it will be evident that various modifications and changes may be made to these embodiments without departing from the broader spirit and scope of the various embodiments.

In one embodiment, a method includes a server (e.g., a computer server 100) to generate a behavioral model 102 of a data center 104 when a machine learning algorithm 106 is applied using a processor 108 and a memory 110. The behavioral model 102 is structured based on analysis of a team of human modelers 112 that partition the data center 104 into a plurality of connected nodes. The team of human modelers 112 decomposes each node 126 into a connected set 120 of child node 122 and/or a simple component 124.

The child node 122 is a subset 128 of another node 126 and the simple component 124 is a node 126 which has not been further decomposed. The behavioral model 102 of the data center 104 detects an anomaly in a system behavior by recursively applying the behavioral model 102 to each node 126 and simple component 124 for each node 126 to generate a compressed metric vector for the node 136 by reducing a dimension of an input metric vector 140. The input metric vector 140 includes a metric 142 for the node 126 and/or the compressed metric vector from the child node 144.

The server (e.g., a computer server 100) determines an anomalous behavior occurring in the node 126 by comparing the compressed metric vector with a compressed model vector 148. The compressed model vector 148 of the node 126 is a compressed metric vector generated using the metric 142 associated with the node 126 operating non-anomalously and/or the compressed model vector 148 of child node 122. The method determines a root cause 152 of a failure caused by the anomaly and automatically recommends an action 156 to an operator 158 to resolve a problem caused by the failure. The data center 104 is kept in a normal state by taking proactively actions (using proactive action function 160) based on the behavioral model 102 using the machine learning algorithm 106.

The team of human modelers 112 may identify characteristic including a label 206, a type 208, a category 210, and/or a connection 212 of each of the nodes. The group 214 each of the nodes having similar characteristics in the server (e.g., a computer server 100) may be defined by the team of human modelers 112. The machine learning algorithm 106 may improve the behavioral model 102 based on a human knowledge 220 applied in real time as the input 222 by the team of human modelers 112. The dimension of the input metric vector 140 may be reduced using a principal component analysis 302 and/or a neural network 304.

A full system model of the data center 104 may be automatically updated based on a dynamic change 402 detected from a creation (e.g., using a creation function 404), destruction (e.g., using a destruction function 406), and/or a modification (e.g., using a modification function 408) of an interconnection 410 and/or a flow 412 in the data center 104 based on a reapplication (e.g., using a reapplication function 414) of the human knowledge 220 to further enhance the machine learning algorithm 106. The full system model of the data center 104 may be automatically updated based on the dynamic change 402 detected when the node 126 is added, deleted, and/or moved in the data center 104.

In another embodiment, a method generates a behavioral model 102 of a data center 104 when a machine learning algorithm 106 is applied using a processor 108 and a memory 110. The behavioral model 102 is trained based on a human knowledge 220 deconstruction of the data center 104 into a set of connected simplified components. The method detects an anomaly in a system behavior based on the behavioral model 102 of the data center 104. The data center 104 is kept in a normal state by taking proactively actions (e.g., using proactive action function 160) based on the behavioral model 102 using the machine learning algorithm 106.

The behavioral model 102 may be generated based on an analysis of a team of human modelers 112 that decompose a complex system of the data center 104 into a connected system of smaller constituent subsystems. The smaller constituent subsystems may be further decomposed by the team of human modelers 112 into the set of connected simple component(s) 124. The metric 142 of each of the smaller constituent subsystems may be compressed in a recursive fashion to ultimately build a full system model of the data center 104 at a point in time.

In yet another embodiment, a system of a machine learning environment 101 includes a computer server 100 of the machine learning environment 101. The computer server 100 includes one or more computers having instructions stored thereon that when executed cause the one or more computers to generate a behavioral model 102 of a data center 104 when a machine learning algorithm 106 is applied using a processor 108 and a memory 110. The behavioral model 102 is trained based on a human knowledge 220 deconstruction of the data center 104 into a set of connected simplified components.

The system detects an anomaly in a system behavior based on the behavioral model 102 of the data center 104 and determines a root cause 152 of a failure caused by the anomaly. An operator 158 automatically recommends an action to resolve a problem caused by the failure. The data center 104 is kept in a normal state by taking proactively actions (using proactive action function 160) based on the behavioral model 102 using the machine learning algorithm 106.

FIG. 1 is a network view 180 of generating a behavioral model 102 of a data center 104 when a machine learning algorithm 106 is applied using a processor 108 and a memory 110, according to one embodiment. Particularly, FIG. 1 illustrates a computer server 100, a machine learning environment 101, a behavioral model 102, a client device(s) 103, a data center 104, a user 105, a machine learning algorithm 106, a database 107, a processor 108, a memory 110, a team of human modelers 112, a partition function 114, a plurality of connected nodes 116, a decomposition function 118, a connected set 120, a child node 122, a simple component 124, a node 126, a subset 128, an anomaly 130, a system behavior 132, a recursive function 134, a compressed metric vector for node 136, a dimension reduction function 138, an input metric vector 140, a metric 142, a compressed metric vector for child node 144, a compare function 146, a compressed model vector 148, a generation function 150, a root cause 152, a failure function 154, an action 156, an operator 158, a proactive action function 160, according to one embodiment.

Particularly, FIG. 1 illustrates, a computer server 100 which may be a computer system that provides local area networking services to multiple user(s) 105, according to one embodiment. A machine learning environment 101 can be an imaginary environment which may be subfield of computer science (CS) and/or artificial intelligence (AI) that deals with the construction and/or the study of systems that can learn from data, according to one embodiment. A behavioral model 102 may be a behavioral approach to a system theory and/or a control theory which may results in resolving inconsistencies present in classical approaches based on state-space, transfer function, and/or convolution representations, according to one embodiment.

A client device(s) 103 may be computer hardware and/or software that may accesses a service made available by the computer server 100, according to one embodiment. A data center 104 may be a facility used to house computer systems and/or associated components (e.g., telecommunication systems, and/or storage systems). The data may be stored in the data center 104 in the form of racks (e.g., Rack 1, Rack 2 . . . etc.), according to one embodiment.

A user 105 may be a person who uses a computer or network 109 services. The user(s) 105 are also widely characterized as the class of people that use a system without complete technical expertise required to understand the system fully, according to one embodiment. In one embodiment, a machine learning algorithm 106 may be an algorithm to learn system behavior 132, i.e., builds model(s) which may include hierarchical approach and/or leveraging human knowledge to build component and/or group models. The combination of hierarchical approach and leveraging human knowledge may build sub-system models and/or system model, according to one embodiment.

For example, in one embodiment, the tree-structured organization of the data center 104 may be as shown in FIG. 1. The root of a tree may represent the entire data center (DC) 104. The children of the root may represent the major components such as a Load Balancer, and 2 Racks. The leaves at the bottom may represent a metric 142 being associated with the individual components. The FIG. 1 may also show the levels associated with each node 126 in the tree, where the level for a node 126 i may be defined as:

$$\text{level}(i)=\text{argmax}_j(\text{level}(j))+1, \text{ where } j \in \text{children}(i)$$

$$\text{level}(i)=0, \text{ where } i \text{ is a leaf}$$

The algorithms for training and applying the behavior models may work similarly. They may start from level 1 (lowest level component), and may compute the models for the node(s) 126 from its children (metric(s) 142). Models for level 2 may be computed using its children, which can be metric(s) 142 or the outputs of level 1 child models. This process may be continued upwards until the model at the root is computed. The algorithm is given below.

0. Assume inputs:
    a. a collection of metric vectors for each component, where each vector may represent all the metric(s) 142 associated with a component and collected at the same time, and,
    b. a tree representing the containment structure of the infrastructure.
1. Compute level for each node 126 in the tree. A simple recursion (using recursive function 134) implementing the level formula is used.
2. maxlevel=level(root)
3. for (curlvl=1; curlvl<maxlevel; curlvl++)
    a. curnodes=getAllNodesAtlevel(curlvl)
    b. for (curnode:curnodes)
        i. trainingData=collectTrainingDataForNode(curnode)//see explanation below
        ii. curnode.model=buildModel(trainingData)//see explanation below
        iii. results=curnode.model.apply(trainingData)//see explanation below
        iv. modelOutputs=getModelOutput(results)//see explanation below
        v. trainingData.append(modelOutputs)//add outputs to trainingData, to train the parent node(s) later collectTrainingDataForNode—This collects all metric vectors associated with the node 126, including the output metric(s) 142 from any child node(s) 122.

buildModel—trains a model from the training data. Common algorithms are Principal Component Analysis (PCA) and Artificial Neural Network (ANN).

Model.apply—applies the model on input metric vector(s) 140, producing an output metric vector(s). It may also produce a boolean indicating if an anomaly 130 is found.

getModelOutput—gets the output metric vector(s) from the result of a model application.

A database 107 may be an organized collection of data that can be accessed immediately and/or manipulated by the computer server 100, according to one embodiment. A processor 108 may be a central processing unit (CPU) within the computer server 100 that may carry out the instructions of a computer program by performing the basic arithmetical, logical, and/or input/output operations, according to one embodiment. A memory 110 may be a physical device used to store programs and/or data on a temporary and/or permanent basis for use in the computer and/or other digital electronic device forming the computer server 100, according to one embodiment.

A team of human modelers 112 may be a group of human beings which enables individuals or businesses (also known as requesters) to co-ordinate the use of human intelligence to perform tasks that computers are currently unable to do, according to one embodiment. A partition function 114 may be a set of instructions that may ensure the team of human modelers 112 to divide the data center 104 into a plurality of connected nodes 116, according to one embodiment. The plurality of connected nodes 116 may be a bunch of node(s) 126 (e.g., a child node 122, which is already a subset 128 of another node 126 and/or a simple component 124 which may not been further decomposed) when connected with each other, according to one embodiment.

A decomposition function 118 may be the set of instructions that may ensure the process by which a complex problem or system may be broken down into parts which may be easier to conceive, understand, program, and/or maintain, according to one embodiment. The team of human modelers 112 may decompose each node 126 into a connected set 120 of child node 122 and/or a simple component 124, according to one embodiment. A connected set 120 may be a group of combining a child node(s) 122 with the simple component 124 from the plurality of connected nodes 116 of the machine learning environment 101, according to one embodiment. A child node 122 may be a node 126 which may be obtained from the parent node. The child node 122 may be a subset 128 of another node 126, according to one embodiment.

A simple component 124 may be node 126 which may not be further decomposed, according to one embodiment. A node 126 may be an active electronic device which may be attached to a network 109, and may be capable of sending, receiving, and/or forwarding information over a communication channel, according to one embodiment. A subset 128 may be a set each of whose elements may be an element of an inclusive set, according to one embodiment. An anomaly 130 may be condition in a system behavior 132 that may be derivate by recursively (using recursive function 134) applying the behavioral model 102 to each node 126 and simple component 124 using the behavioral model 102 of the data center 104 of the machine learning environment 101, according to one embodiment.

A system behavior 132 may be a set of parameters (e.g., transfer function, time domain analysis, frequency domain analysis, first order system and/or second order system.) monitored based on the behavioral model 102 of the data center 104, according to one embodiment. A recursive function 134 may be a set of instructions which may ensure a procedure and/or subroutine, implemented in a programming language, whose implementation may reference it. The metric 142 of each of the smaller constituent subsystems may be compressed in a recursive fashion (using recursive function 134) to ultimately build a full system model of the data center 104 at a point in time, according to one embodiment. A compressed metric vector for node 136 may be a metric vector which can be generated by reducing a dimension of an input metric vector 140, according to one embodiment.

A dimension reduction function 138 may be a set of instructions that may ensure the reduction of the dimension of the input metric vector 140 using a principal component and/or a neural network, according to one embodiment. An input metric vector 140 may be a multidimensional space where each software component (e.g., a module) may be represented as a point with distinct coordinates. The input metric vector 140 may include a metric 142 for the node 126 and/or the compressed metric vector from the child node 122, according to one embodiment. A metric 142 may be a property of a route in computer networking, which can be of any value used by a routing protocol to determine whether one particular route should be chosen over another, according to one embodiment.

A compressed metric vector for child node 144 may be an input metric vector 140 of which the dimension may be reduced (using dimension reduction function 138) to generate a compressed metric vector for the node 136 (e.g., parent node), according to one embodiment. A compare function 146 may be a set of instructions that ensures the comparison between the compressed metric vectors with a compressed model vector 148 to determine the occurrence of anomalous behavior in the node 126, according to one embodiment. A compressed model vector 148 may be a compressed metric vector generated using the metric 142 associated with the node 126 operating non-anomalously, according to one embodiment. A generation function 150 may be a set of instructions that may generate a metric 142 which may be associated with the node 126 operating non-anomalously and/or the compressed model vector 148 of a child node 122, according to one embodiment.

A root cause 152 may be an initiating cause of a causal chain which may lead to an outcome and/or effect of interest. In one embodiment a root cause of the failure is determined by an anomaly 130, according to one embodiment. A failure function 154 may be a set of instructions that may ensure the frequency rate with which an engineered system and/or component fails. The failure function may resolve a problem caused by the failure by automatically recommending an action to an operator, according to one embodiment. An action 156 may be a fact and/or process of doing something, according to one embodiment. In one embodiment, the data center 104 may be kept in a normal state by taking proactively actions based on the behavioral model 102 using the machine learning algorithm 106. An operator 158 may automatically recommend an action to resolve a problem which will be caused by the failure, according to one embodiment. A proactive action function 160 may be a set of instructions that may create and/or control a situation to keep the data center in a normal state based on the behavioral model 102 using the machine learning algorithm 106.

FIG. 1 illustrates the computer server 100 may be communicatively coupled with the machine learning algorithm 106 and the data center 104 of the machine learning environment 101. The machine learning environment 101 may be coupled with the client device(s) 103 of the user 105 through the network 109. The computer server 100 may include the processor 108 may be communicatively coupled with the memory 110 and the database 107. In the machine learning environment 101, the data center 104 may be connected to the behavioral model 102 and may be further connected to the plurality of connected nodes 116. The set of node(s) 126 may be connected to sets of child node 122 and/or simple component 124. The input metric vector 140 may include metric(s) 142 and/or compressed metric vectors for child node 144 connected to set of node(s) 126. The data center 104 may be further connected to team of human modelers 112, according to one embodiment.

In circle '1', a behavioral model 102 of a data center 104 may be generated when a machine learning algorithm 106 may be applied using a processor 108 and a memory 110, according to one embodiment. In circle '2', the behavioral model 102 may be structured based on an analysis of a team of human modelers 112 which may partition (using partition function 114) the data center 104 into a plurality of connected node(s) 116. The node (126) may be further decomposed by the team of human modelers 112 into a connected set 120 including a child node 122 and/or a simple component 124. The child node 122 may be a node 126 which may be a subset 128 of another node and the simple component 124 may be a node 126 which has not been further decomposed, according to one embodiment. In circle '3', the behavior model of the data center 104 may detect an anomaly 130 in a system behavior 132 by recursively (using recursive function 134) applying the behavioral model 102 to each node 126 and/or the simple component 124, according to one embodiment.

In circle '4', the computer server 100 may generate a compressed metric vector for node 136 by reducing a dimension (using dimension reduction function 138) of an input metric vector 140. The input metric vector 140 may include a metric 142 for the node 126 and/or the compressed metric vector from the child node. The anomalous behavior occurring in the node 126 may be determined by comparing (using compare function 146) the compressed metric vector with a compressed model vector 148, according to one embodiment. In circle '5', a root cause of a failure may be determined by the anomaly 130, according to one embodiment. In circle '6', an action may automatically recommend an operator to resolve a problem caused by the failure. The data center 104 may be kept in a normal state by taking proactively actions based on the behavioral model 102 using the machine learning algorithm 106, according to one embodiment.

Figure 2:
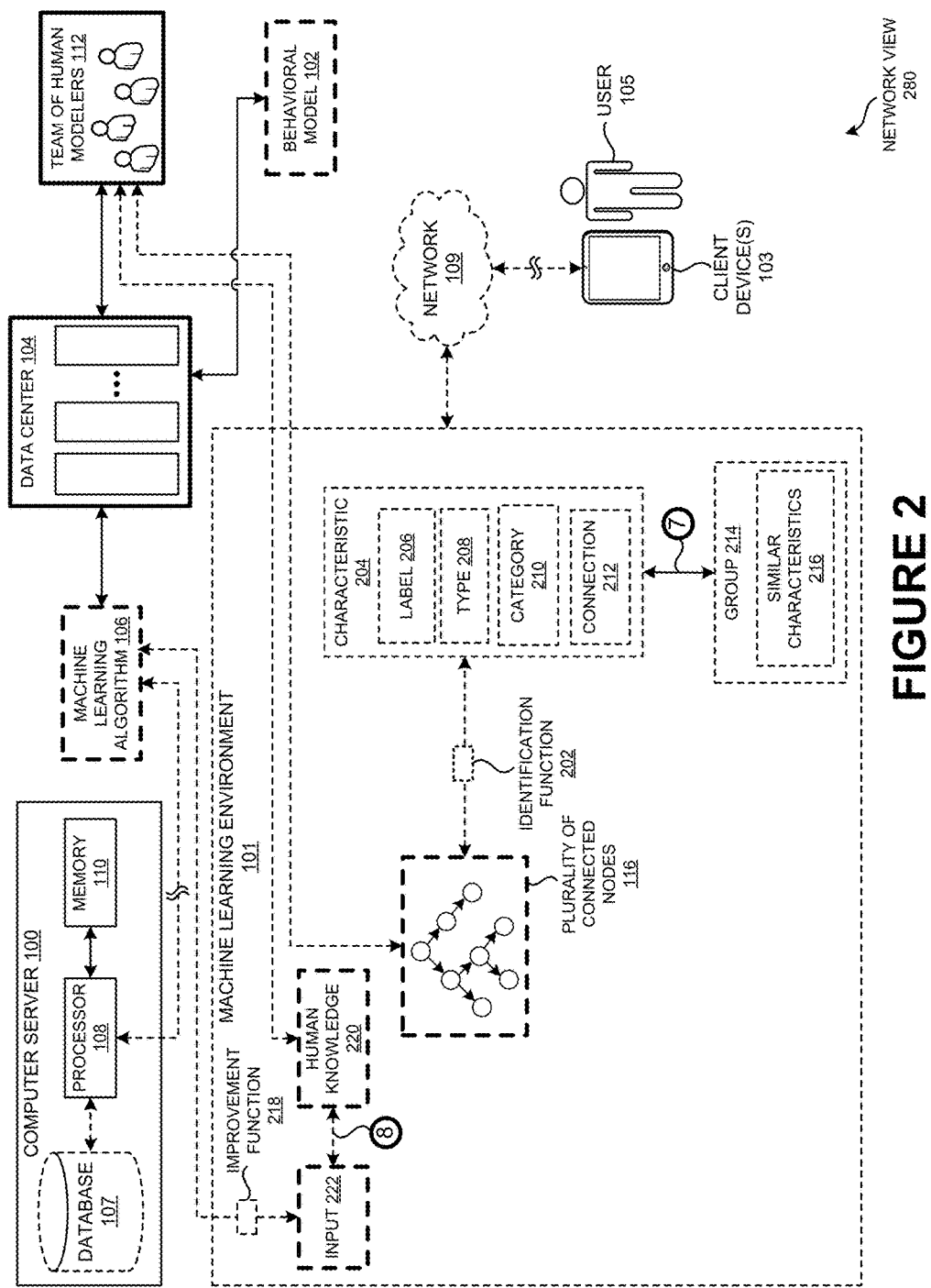
FIG. 2 is a network view that illustrates the improvement of the behavioral model based on a human knowledge using machine learning algorithm of FIG. 1, according to one embodiment.

FIG. 2 is a network view 280 that illustrates the improvement of the behavioral model 102 based on a human knowledge 220 using machine learning algorithm 106 of FIG. 1, according to one embodiment. Particularly, FIG. 2 builds on FIG. 1, and further adds an identification function 202, a characteristic 204, a label 206, a type 208, a category 210, a connection 212, a group 214, a similar characteristic 216, an improvement function 218, an human knowledge 220, an input 222, according to one embodiment.

An identification function 202 may be a set of instructions that may ensure to identify (using identification function 202) one of the characteristic(s) 204 (e.g., a label 206, a type 208, a category 210 and/or a connection 212) from the plurality of connected node(s) 116, according to one embodiment. A characteristic(s) 204 may be a feature, attribute and/or quality belonging typically to a person, place, or thing and serving to identify (using identification function 202) it in each of the node(s) 126, according to one embodiment. A label 206 may be a small piece of paper, fabric, plastic, and/or similar material attached to an object and giving information about each of the nodes, according to one embodiment.

A type 208 may be a category 210 of people and/or things having common characteristic(s) 204 in each of the node(s) 126, according to one embodiment. A category 210 may be a class and/or division of people and/or things regarded as having particular shared characteristic(s) 204 about each of the nodes, according to one embodiment. A connection 212 may be a relationship in which a person, a thing, and/or an idea may be linked and/or associated with something else about each of the node(s) 126, according to one embodiment. A group 214 may be a number of people and/or things which are located close together are considered and/or classed together, according to one embodiment. In one embodiment, the smaller constituent subsystems having similar characteristic(s) 216 may be grouped by the team of human modelers 112.

A similar characteristic 216 in the computer server 100 may be the characteristic 204 (e.g., a label 206, a type 208, a category 210 and/or a connection 212) showing resemblance in qualities, and/or appearance to constitute a group 214 of each of the nodes, according to one embodiment. An improvement function 218 may be a set of instructions given to the machine learning algorithm 106 which may improve the behavioral model 102 based on the human knowledge 220, according to one embodiment. A human knowledge 220 may be a familiarity, awareness and/or understanding of someone and/or something, such as facts, information, descriptions, and/or skills, which may be acquired through experience and/or education by perceiving, discovering, and/or learning, according to one embodiment. In one embodiment, the human knowledge 220 can be applied to the machine learning algorithm 106 to improve (using improvement function 218) the behavioral model 102.

An input 222 may be the term denoting an entrance and/or changes which may be inserted into a system and which activate and/or modify a process, according to one embodiment. In one embodiment, a human knowledge 220 in the real time can be applied as an input 222 by the team of human modelers 112 to improve (using improvement function 218) the behavioral model 102 using the machine learning algorithm 106.

FIG. 2 illustrates the computer server 100 may be communicatively coupled with the machine learning algorithm 106 and the data center 104 of the machine learning environment 101. The machine learning environment 101 is coupled with the client device(s) 103 of the user 105 through the network 109. The computer server 100 may include the processor 108 may be communicatively coupled with the memory 110 and the database 107, according to one embodiment.

In the machine learning environment 101, the data center 104 may be connected to behavioral model 102 and may further connect to the plurality of connected nodes 116. The characteristic(s) 204 (e.g., a label 206, a type 208, a category 210 and/or a connection 212) of nodes can be identified (using identification function 202) by the team of human modelers 112 which may further form a group 214 of node(s) 126 with similar characteristic(s) 216. The human knowledge 220 from the team of human modelers 112 may be served as an input 222 to the machine learning algorithm 106, according to one embodiment.

In circle '7', the team of human modelers 112 may identify (using identification function 202) the characteristic(s) 204 which may include a label 206, a type 208, a category 210 and/or a connection 212 of each of the node(s) 126. The team of human modelers 112 may manually define a group 214 having each of the nodes having a similar characteristic 216 in the computer server 100, according to one embodiment. In circle '8', a human knowledge 220 may be applied in real time as the input 222 by the team of human modelers 112 to the machine learning algorithm 106 which may improve (using improvement function 218) the behavioral model 102, according to one embodiment.

Figure 3:
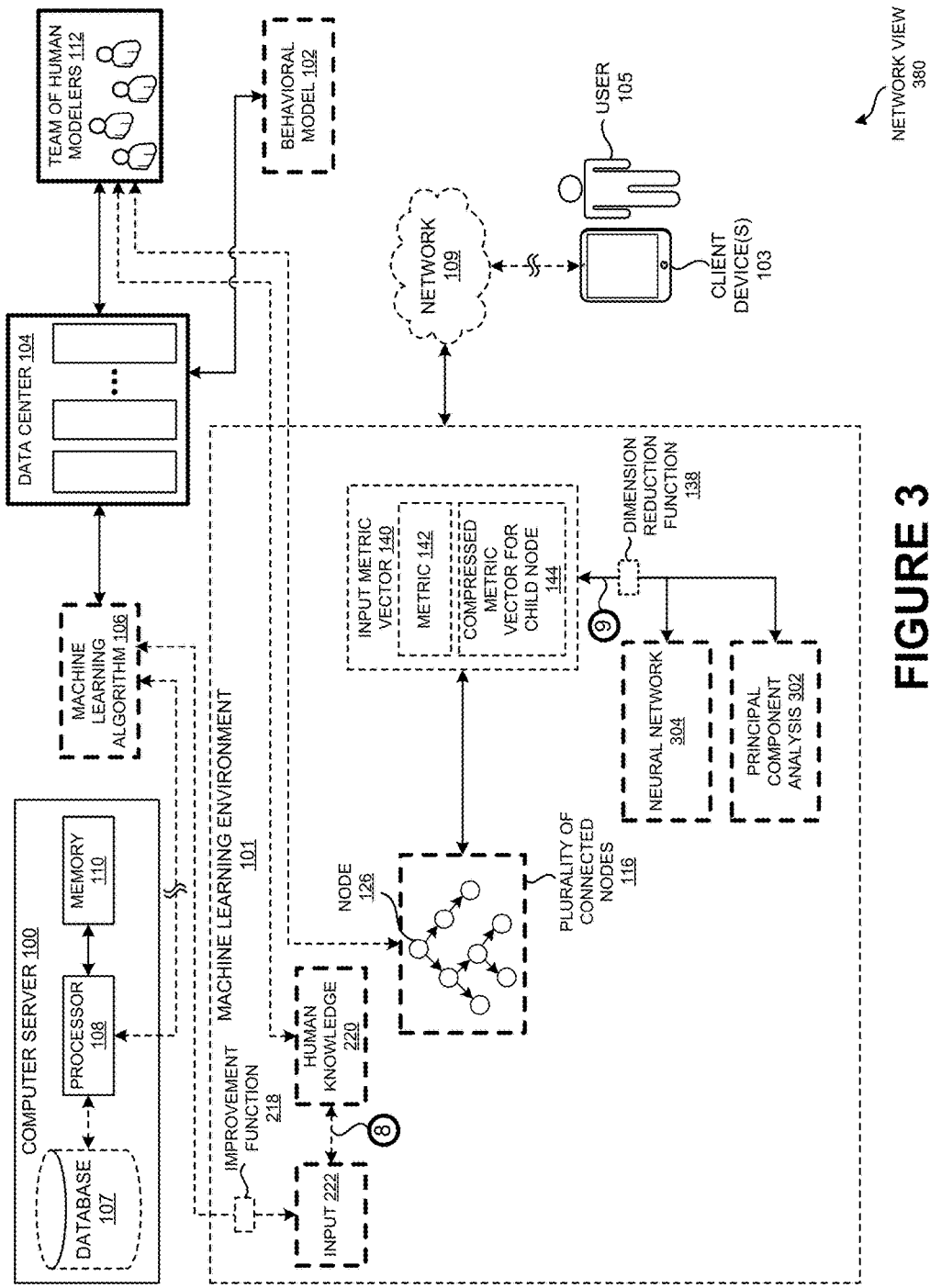
FIG. 3 is a network view that illustrates the reduction of input metric vector using principal component analysis and/or a neural network of the computer server of FIG. 1, according to one embodiment.

FIG. 3 is a network view 380 that illustrates the reduction of input metric vector 140 using principal component analysis 302 and/or a neural network 304 of the computer server 100 of FIG. 1, according to one embodiment. Particularly, FIG. 3 builds on FIG. 1, and further adds a principal component analysis 302, a neural network 304, according to one embodiment.

A principal component analysis (PCA) 302 may be a statistical procedure that may use an orthogonal transformation to convert a set of observations of possibly correlated variables into a set of values of linearly uncorrelated variables called principal components, according to one embodiment. In one embodiment, the principal component analysis (PCA) 302 is a statistical method that may compute a linear transformation from an N-dimensional space of metric(s) 142 (may be correlated) to another N-dimensional space of metric(s) 142 that are independent. If the input metric(s) 142 are correlated, the transformed space dimensions can be reduced by truncating the dimensions with least variance. Thus, in most practical applications, PCA may transform from an N-dimensional space to a much smaller K-dimensional space (i.e., K<<N).

PCA may be a popular technique to build behavior model(s) 102. Typical behavioral model(s) 102 may try to distinguish "normal" from "abnormal" (or "anomaly"). The PCA transformation V may compute using a set of metric 142 vectors, each vector representing the "normal" behavior at a specific time. The number of Principal Components (PCs) may be choosing to minimize loss of information. One way may direct to choose the top K PCs, which may retain 90% of total variance in the data. If K PCs are chosen, the PCA transformation V may become a matrix of size N×K. A metric vector X may be transformed to the PC space, using multiplication with V.

$V$—PCA transform, $X$—input metric vector, $Y$—output metric vector, $$Y = X \cdot V$$

Anomaly can be detected by mapping the transform output Y back to original N-dimensional input space by multiplying it with the transpose of V.

$$\tilde{X} = Y \cdot V^T = X \cdot (V \cdot V^T)$$

Anomaly can also be detected by computing the deviation, $E^2 = (X - \tilde{X})^2$, and by applying a suitable threshold on $E^2$.

A neural network 304 may be a computational model which may be inspired by an animal's central nervous systems (in particular the brain) which may be capable of machine learning and/or pattern recognition, according to one embodiment. In one embodiment, Artificial Neural Network (ANN) 304 may be a mathematical model inspired by human neural processing. Unlike PCA, ANN may be capable of learning non-linear mapping from an input 222 to an output. To build behavior model(s) 102 using ANN, we can use a variation of ANN that may be equivalent to a non-linear PCA. A procedure similar to the one described in PCA above, can be used for building models at different levels and applying them.

FIG. 3 illustrates the computer server 100 may be communicatively coupled with the machine learning algorithm 106 and the data center 104 of the machine learning environment 101. The machine learning environment 101 is coupled with the client device 103 of the user 105 through the network 109. The computer server 100 may include the processor 108 may be communicatively coupled with the memory 110 and the database 107, according to one embodiment.

In the machine learning environment 101, the data center 104 may be connected to behavioral model 102 and may further connect to the plurality of connected nodes 116. The input metric vector 140 (a multidimensional space where all software components may be defined with a distinct coordinates) may be with the plurality of connected nodes 116. The combination of a neural network 304 and/or principal component analysis 302 may be communicatively coupled to the input metric vector 140, according to one embodiment.

In circle '9', the compressed metric vector may be generated to reduce the dimension (using dimension reduction function 138) of the input metric vector 140 by using a neural network 304 and/or a principal component analysis 302, according to one embodiment.

Figure 4:
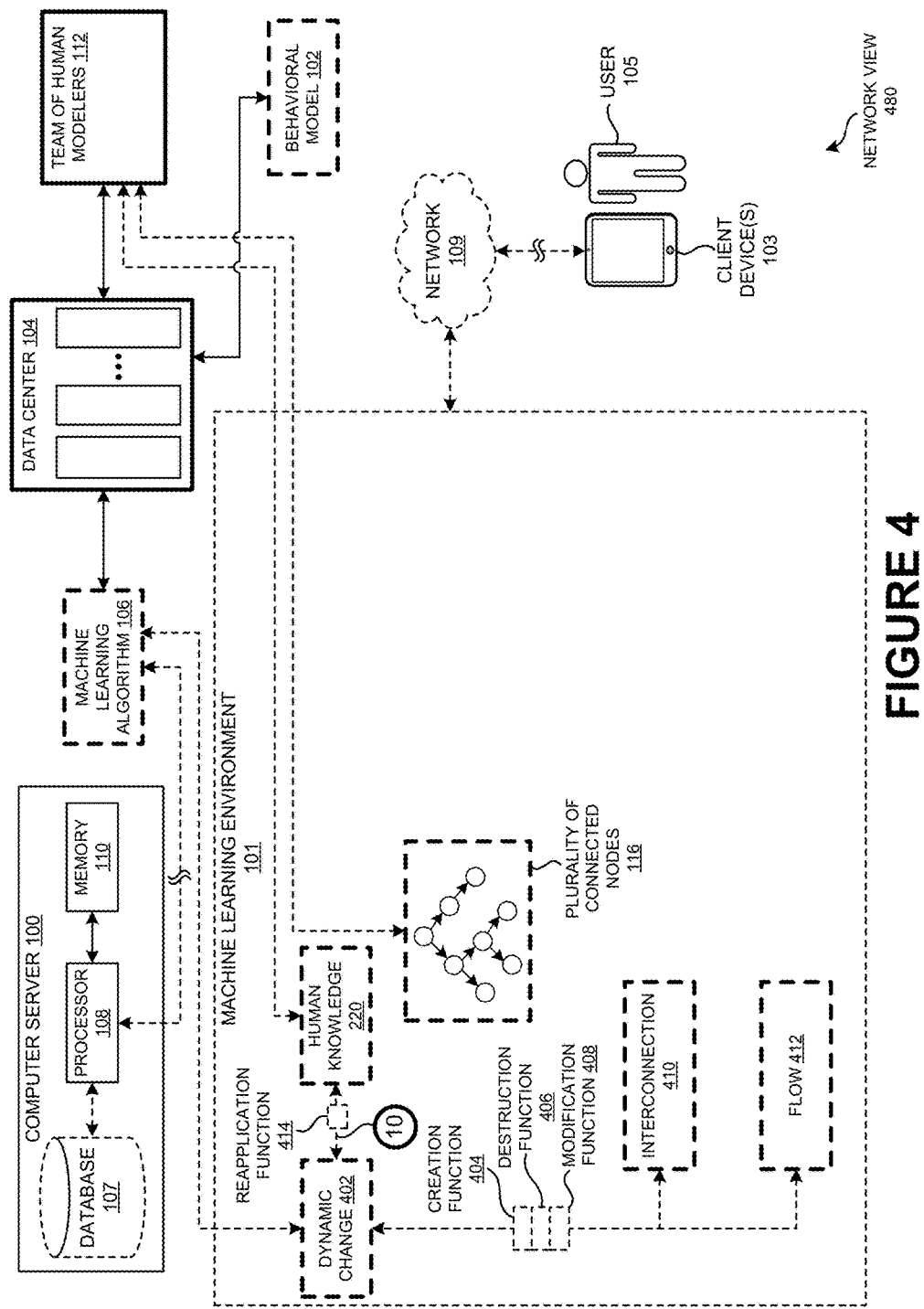
FIG. 4 illustrates an enhancement of the machine learning algorithm based on a dynamic change, detected and modified in the data center of the computer server of FIG. 1, according to one embodiment.

FIG. 4 illustrates a network view 480 of an enhancement of the machine learning algorithm 106 based on a dynamic change, detected and modified in the data center 104 of the computer server 100 of FIG. 1, according to one embodiment. Particularly FIG. 4 builds on FIG. 1 and FIG. 2, and further adds a dynamic change 402, a creation function 404, a destruction function 406, a modification function 408, an interconnection 410, a flow 412, and a reapplication function 414, according to one embodiment.

A dynamic change 402 may be a set of instructions that may ensure process and/or system characterized by constant change, activity and/or progress. A dynamic change may be detected from a creation, destruction and/or a modification of an interconnection and/or flow in the data center 104 which may automatically update a full system model of the data center 104, according to one embodiment. A creation function 404 may be a set of instructions that may ensure the action and/or process of bringing into existence in an interconnection and/or a flow in the data center 104 based on a reapplication (using reapplication function 414) of the human knowledge which may further enhance the machine learning algorithm 106, according to one embodiment.

A destruction function 406 may be a set of instructions that may ensure the action and/or process of causing so much destruction to an interconnection and/or a flow in the data center 104 based on a reapplication (using reapplication function 414) of the human knowledge which may further enhance the machine learning algorithm 106, according to one embodiment. A modification function 408 may be a set of instructions that may ensure the act and/or process of changing parts of something an interconnection and a flow in the data center 104 based on a reapplication (using reapplication function 414) of the human knowledge which may further enhance the machine learning algorithm 106, according to one embodiment.

An interconnection 410 may be a connection between a carrier's facilities and the equipment belonging to its user, according to one embodiment. In one embodiment, the interconnection may refer to a modification, adjustment, and/or alteration in the device connections to attain a target result. A flow 412 may be a pattern of processing the input given to a system to achieve the desired result based on the behavioral model 102 of the machine learning environment 101, according to one embodiment.

A reapplication function 414 may be a set of instruction that may ensure the act of reapplication of human knowledge 220 to further enhance the machine learning algorithm 106. The reapplication of the human knowledge 220 may result in a dynamic change in the full system data center which may be detected from a creation (using creation function 404), destruction (using destruction function 406), and/or a modification (using modification function 408) of an interconnection 410 and/or flow 412, according to one embodiment.

FIG. 4 illustrates the computer server 100 may be communicatively coupled with the machine learning algorithm 106 and/or the data center 104 of the machine learning environment. The machine learning environment may be coupled with the client device of the user through the network. The computer server 100 may include the processor 108 which may be communicatively coupled with the memory 110 and/or the database 107, according to one embodiment. The data center 104 may be connected to behavioral model and may be further connected to the plurality of connected nodes. The interconnection and/or the flow may be associated with the dynamic change using destruction, creation and/or modification functions, according to one embodiment.

In circle '10', a full system model of the data center 104 may be automatically updated based on a dynamic change detected from a creation, destruction, and/or a modification of an interconnection and/or a flow in the data center 104 based on a reapplication (using reapplication function 414) of the human knowledge which may further enhance the machine learning algorithm 106. The full system model of the data center 104 may be automatically updated based on the dynamic change detected when the node is added, deleted, and/or moved in the data center 104, according to one embodiment.

FIG. 5A is a critical path view of generating a behavioral model of a data center when a machine learning algorithm is applied to the computer server of FIG. 1 using a processor and a memory, according to one embodiment.

In an operation 502, a computer server may apply machine learning algorithm using processor and memory, according to one embodiment. In an operation 504, the computer server may generate behavior model of data center, according to one embodiment. In an operation 506, a team of human modelers may partition the data center into a plurality of nodes, according to one embodiment. In an operation 508, a team of human modelers may further decompose each node into a connected set comprising at least one of child node and a simple component, according to one embodiment.

In an operation 510, the computer server may detect an anomaly in a system behavior using the behavior model of the data center by recursively applying the behavioral model to each node and simple component, according to one embodiment. In one operation 512, the computer server may generate a compressed metric vector for the node by reducing the dimension of an input metric vector, according to one embodiment. In one operation 514, the computer server may determine whether anomalous behavior is occurring in the node by comparing the compressed metric vector with a compressed model vector, according to one embodiment.

Figure 5B:
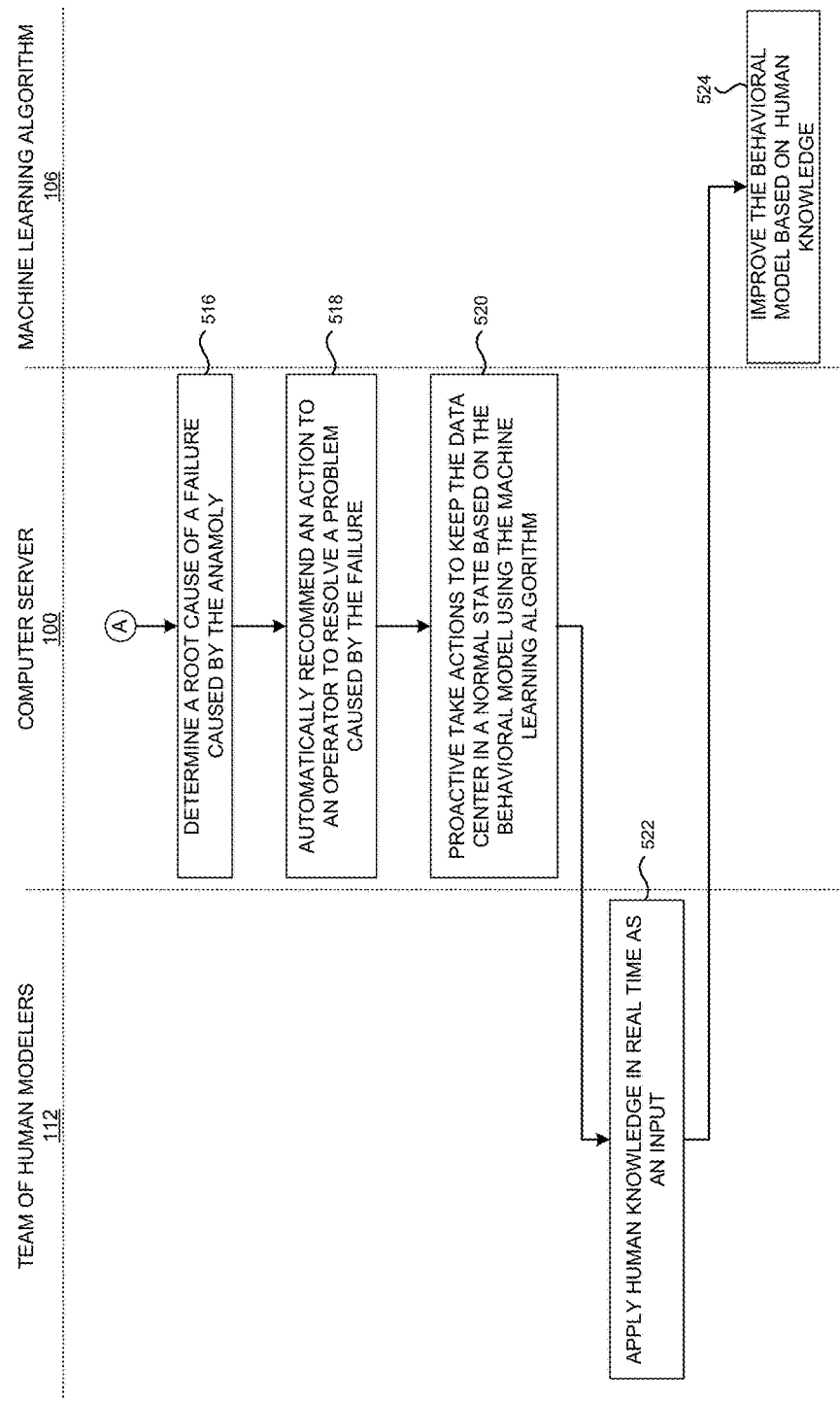
FIG. 5B is a critical path view of improving the behavioral model of the data center of the FIG. 1, based on human knowledge, according to one embodiment.

FIG. 5B is a critical path view of improving the behavioral model of the data center of the FIG. 1, based on human knowledge, according to one embodiment.

In an operation 516 a computer server may determine a root cause of a failure caused by the anomaly, according to one embodiment. In an operation 518, the computer server may automatically recommend an action to an operator to resolve a problem caused by the failure, according to one embodiment. In an operation 520 the computer server may proactive take actions to keep the data center in a normal state based on the behavioral model using the machine learning algorithm, according to one embodiment. In an operation 522, a team of human modelers may apply human knowledge in real time as an input, according to one embodiment. In an operation 524, a machine learning algorithm may improve the behavioral model based on human knowledge, according to one embodiment.

Figure 6:
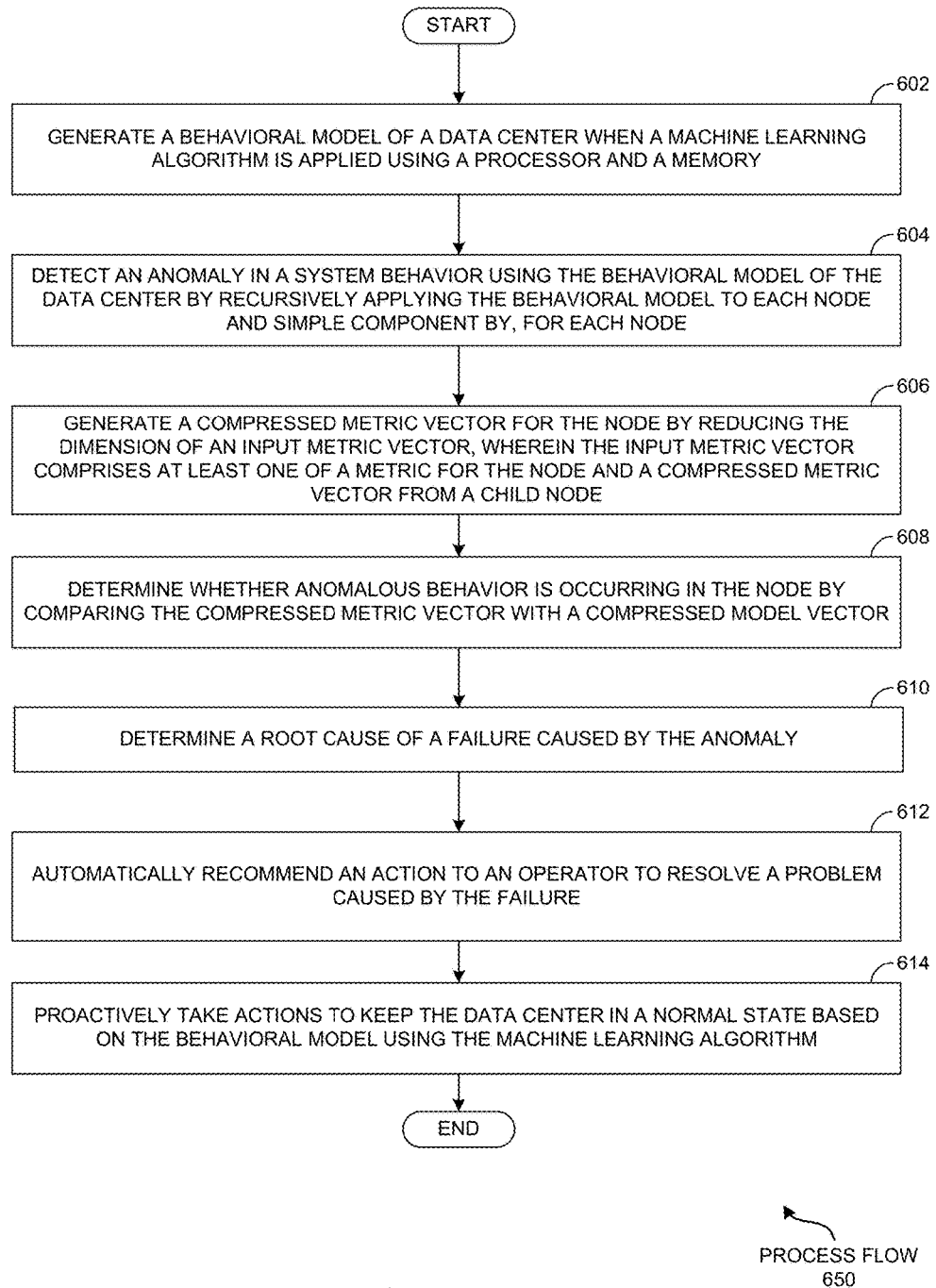
FIG. 6 is a process flow of actions taken to keep the data center in a normal state based on the behavioral model using the machine learning algorithm of the FIG. 1, according to one embodiment.

FIG. 6 is a process flow 650 illustrating actions taken to keep the data center in a normal state based on the behavioral model using the machine learning algorithm, according to one embodiment. Particularly, FIG. 6 illustrates the process of behavioral modeling of a data center utilizing human knowledge to enhance a machine learning algorithm, according to one embodiment.

In an operation 602, a behavior model of a data center may be generated when a machine learning algorithm is applied using a processor and a memory, according to one embodiment. In an operation 604, an anomaly may be detected in a system behavior using the behavior model of the data center by recursively applying the behavior model to each node and simple component by and/or for each node, according to one embodiment. In an operation 606, a compressed metric vector may be generated for the node by reducing the dimension of an input metric vector. The input metric may include a metric for the node and a compressed metric vector from a child node, according to one embodiment.

In one operation 608, an anomalous behavior occurring in the node may be determined by comparing the compressed metric vector with a compressed model vector, according to one embodiment. In an operation 610, a root cause of a failure is determined by the anomaly, according to one embodiment. In an operation 612, an action may be automatically recommended to an operator to resolve a problem caused by the failure, according to one embodiment. In an operation 614, the data center may be kept in a normal state by taking proactively actions based on the behavioral model using the machine learning algorithm, according to one embodiment.

Figure 7:
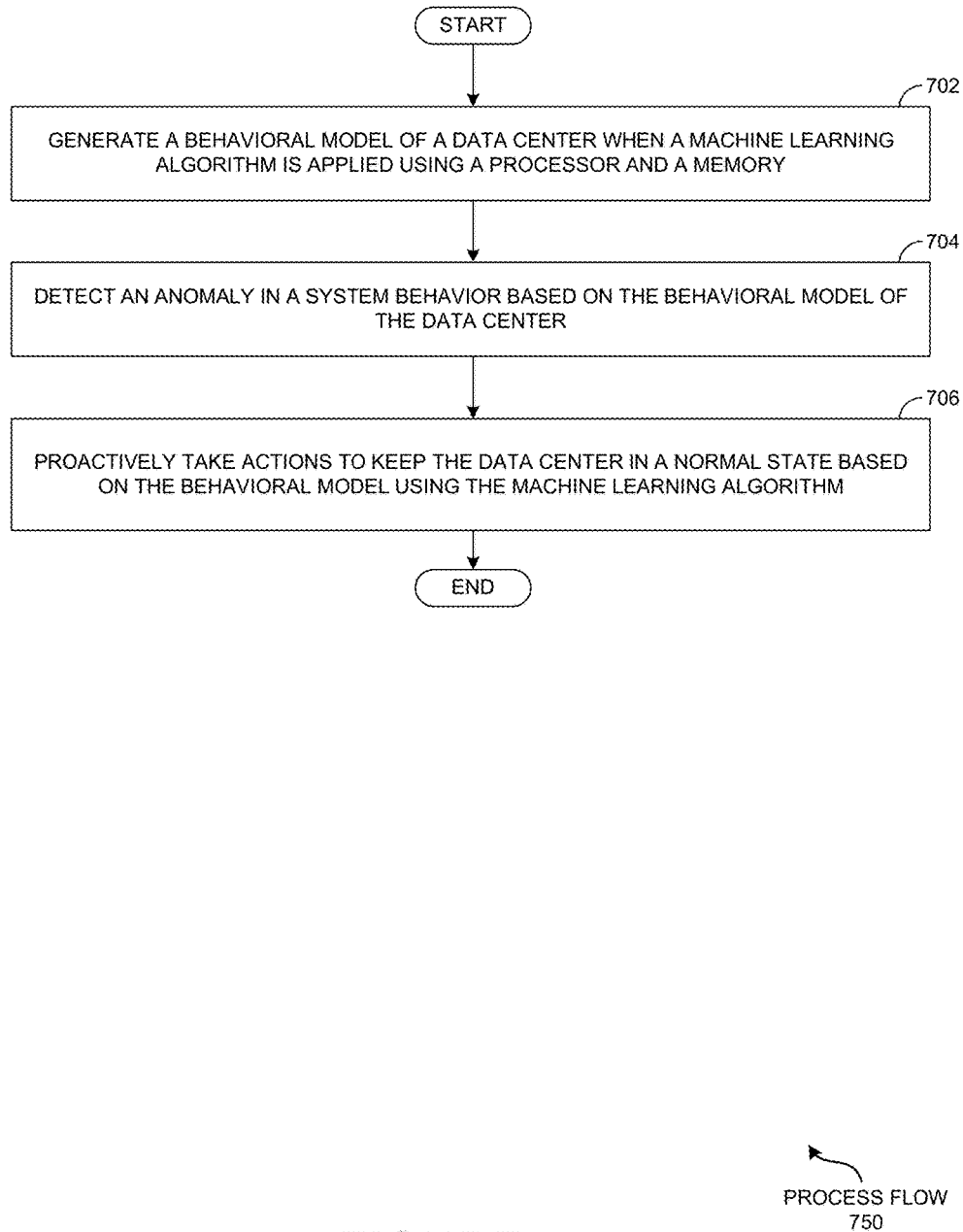
FIG. 7 is a process flow of generating a behavioral model of a data center when a machine learning algorithm is applied using a processor and a memory of the computer server of FIG. 1, according to one embodiment.

FIG. 7 is a process flow 750 illustrates generating a behavioral model of a data center when a machine learning algorithm is applied using a processor and a memory, according to one embodiment. Particularly, FIG. 7 illustrates the process of generating a behavioral model of a data center when a machine learning algorithm is applied using a processor and a memory, according to one embodiment.

In an operation 702, a behavior model of a data center is generated when a machine learning algorithm is applied using a processor and a memory, according to one embodiment. In an operation 704, an anomaly is detected in a system behavior based on the behavioral model of the data center, according to one embodiment. In an operation 706, the data center may be kept in a normal state by taking proactively actions based on the behavioral model using the machine learning algorithm, according to one embodiment.

Figure 8:
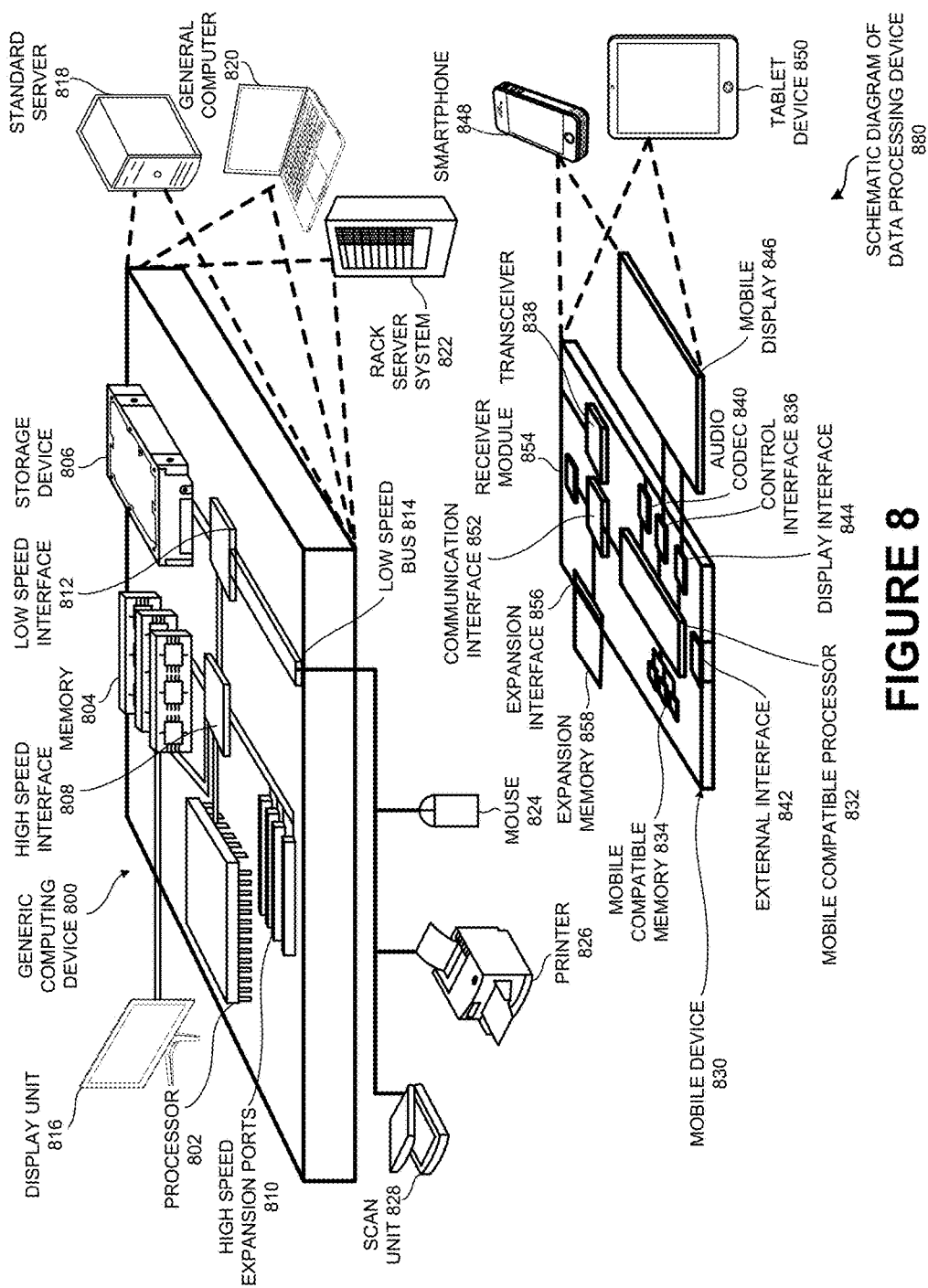
FIG. 8 is a schematic diagram of data processing devices that can be used to implement the methods and systems disclosed in the FIG. 1, according to one embodiment.

FIG. 8 is a schematic diagram of data processing devices 880 that can be used to implement the methods and systems disclosed in the FIG. 1, according to one embodiment.

The computing device 800 may represent various forms of digital computers, such as laptops, desktops, workstations, personal digital assistants, servers, blade servers, mainframes, and/or other appropriate computers. The mobile device 830 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed.

The computing device 800 may include a processor 802, a memory 804, a storage device 806, a high speed interface 808 coupled to the memory 804 and a plurality of high speed expansion ports 810, and a low speed interface 812 coupled to a low speed bus 814 and a storage device 806. In one embodiment, each of the components heretofore may be inter-coupled using various buses, and may be mounted on a common motherboard and/or in other manners as appropriate. The processor 802 may process instructions for execution in the computing device 800, including instructions stored in the memory 804 and/or on the storage device 806 to display a graphical information for a GUI on an external input/output device, such as a display unit 816 coupled to the high speed interface 808.

In other embodiment, multiple processors and/or multiple buses may be used, as appropriate, along with multiple memories and/or types of memory 804. Also, a plurality of generic computing device(s) 800 may be coupled with, with each device providing portions of the necessary operations (e.g., as a server bank, a group of blade servers, and/or a multi-processor system).

The memory 804 may be coupled to the computing device 800. In one embodiment, the memory 804 may be a volatile memory. In another embodiment, the memory 804 may be a non-volatile memory. The memory 804 may also be another form of computer-readable medium, such as a magnetic and/or an optical disk. The storage device 806 may be capable of providing mass storage for the computing device 800. In one embodiment, the storage device 806 may be comprised of at least one of a floppy disk device, a hard disk device, an optical disk device, a tape device, a flash memory and/or other similar solid state memory device.

In another embodiment, the storage device 806 may be an array of the devices in a computer-readable medium previously mentioned heretofore, computer-readable medium, such as, and/or an array of devices, including devices in a storage area network and/or other configurations. A computer program may be comprised of instructions that, when executed, perform one or more methods, such as those described above. The instructions may be stored in at least one of the memory 804, the storage device 806, a memory 804 coupled to the processor 802, and/or a propagated signal.

The high speed interface 808 may manage bandwidth-intensive operations for the computing device 800, while the low speed interface 812 may manage lower bandwidth-intensive operations. Such allocation of functions is exemplary only. In one embodiment, the high speed interface 808 may be coupled to at least one of the memory 804, the display unit 816 (e.g., through a graphics processor and/or an accelerator), and to the plurality of high speed expansion ports 810, which may accept various expansion cards. In the embodiment, the low speed interface 812 may be coupled to at least one of the storage device 806 and the low speed bus 814. The low speed bus 814 may be comprised of a wired and/or wireless communication port (e.g., a Universal Serial Bus ("USB"), a Bluetooth® port, an Ethernet port, and/or a wireless Ethernet port). The low speed bus 814 may also be coupled to at least one of scan unit 828, a printer 826, a keyboard, a mouse 824, and a networking device (e.g., a switch and/or a router) through a network adapter.

The computing device 800 may be implemented in a number of different forms, as shown in the FIG. 8. In one embodiment, the computing device 800 may be implemented as a standard server 818 and/or a group of such servers. In another embodiment, the computing device 800 may be implemented as part of a rack server system 822. In yet another embodiment, the computing device 800 may be implemented as a general computer 820 such as a laptop or desktop computer. Alternatively, a component from the computing device 800 may be combined with another component in a mobile device 830. In one or more embodiments, an entire system may be made up of a plurality of generic computing device(s) 800 and/or a plurality of generic computing device(s) 800 coupled to a plurality of mobile device(s) 830.

In one embodiment, the mobile device 830 may comprise at least one of a mobile compatible processor 832, a mobile compatible memory 834, and an input/output device such as a mobile display 846, a communication interface 852, and a transceiver 838, among other components. The mobile device 830 may also be provided with a storage device 806, such as a microdrive or other device, to provide additional storage. In one embodiment, at least one of the components indicated heretofore are inter-coupled using various buses, and several of the components may be mounted on a common motherboard.

The mobile compatible processor 832 may execute instructions in the mobile device 830, including instructions stored in the mobile compatible memory 834. The mobile compatible processor 832 may be implemented as a chipset of chips that include separate and multiple analog and digital processors. The mobile compatible processor 832 may provide, for example, for coordination of the other components of the mobile device 830, such as control of user interfaces, applications run by the mobile device 830, and wireless communication by the mobile device 830.

The mobile compatible processor 832 may communicate with a user through the control interface 836 and the display interface 844 coupled to a mobile display 846. In one embodiment, the mobile display 846 may be at least one of a Thin-Film-Transistor Liquid Crystal Display ("TFT LCD"), an Organic Light Emitting Diode ("OLED") display, and another appropriate display technology. The display interface 844 may comprise appropriate circuitry for driving the mobile display 846 to present graphical and other information to a user. The control interface 836 may receive commands from a user and convert them for submission to the mobile compatible processor 832. In addition, an external interface 842 may be provide in communication with the mobile compatible processor 832, so as to enable near area communication of the mobile device 830 with other devices. External interface 842 may provide, for example, for wired communication in some embodiments, or for wireless communication in other embodiments, and multiple interfaces may also be used.

The mobile compatible memory 834 may be coupled to the mobile device 830. The mobile compatible memory 834 may be implemented as at least one of a volatile memory and a non-volatile memory. The expansion memory 858 may also be coupled to the mobile device 830 through the expansion interface 856, which may comprise, for example, a Single In Line Memory Module ("SIMM") card interface. The expansion memory 858 may provide extra storage space for the mobile device 830, or may also store an application or other information for the mobile device 830.

Specifically, the expansion memory 858 may comprise instructions to carry out the processes described above. The expansion memory 858 may also comprise secure information. For example, the expansion memory 858 may be provided as a security module for the mobile device 830, and may be programmed with instructions that permit secure use of the mobile device 830. In addition, a secure application may be provided on the SIMM card, along with additional information, such as placing identifying information on the SIMM card in a non-hackable manner.

The mobile compatible memory 834 may comprise at least one of a volatile memory (e.g., a flash memory) and a non-volatile memory (e.g., a non-volatile random-access memory ("NVRAM")). In one embodiment, a computer program comprises a set of instructions that, when executed, perform one or more methods. The set of instructions may be stored on at least one of the mobile compatible memory 854, the expansion memory 858, a memory 804 coupled to the mobile compatible processor 832, and a propagated signal that may be received, for example, over the transceiver 838 and/or the external interface 842.

The mobile device 830 may communicate wirelessly through the communication interface 852, which may be comprised of a digital signal processing circuitry. The communication interface 852 may provide for communications using various modes and/or protocols, such as, at least one of: a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol. Such communication may occur, for example, through the radio-frequency transceiver.

In addition, short-range communication may occur, such as using a Bluetooth®, Wi-Fi, and/or other such transceiver. In addition, a GPS ("Global Positioning System") receiver module may provide additional navigation-related and location-related wireless data to the mobile device 830, which may be used as appropriate by a software application running on the mobile device 830.

The mobile device 830 may also communicate audibly using an audio codec 840, which may receive spoken information from a user and convert it to usable digital information. The audio codec 840 may likewise generate audible sound for a user, such as through a speaker (e.g., in a handset of the mobile device 830). Such a sound may comprise a sound from a voice telephone call, a recorded sound (e.g., a voice message, a music files, etc.) and may also include a sound generated by an application operating on the mobile device 830.

The mobile device 830 may be implemented in a number of different forms, as shown in the FIG. 8. In one embodiment, the mobile device 830 may be implemented as a smartphone 848. In another embodiment, the mobile device 830 may be implemented as a personal digital assistant ("PDA"). In yet another embodiment, the mobile device, 830 may be implemented as a tablet device 850.

Figure 9:
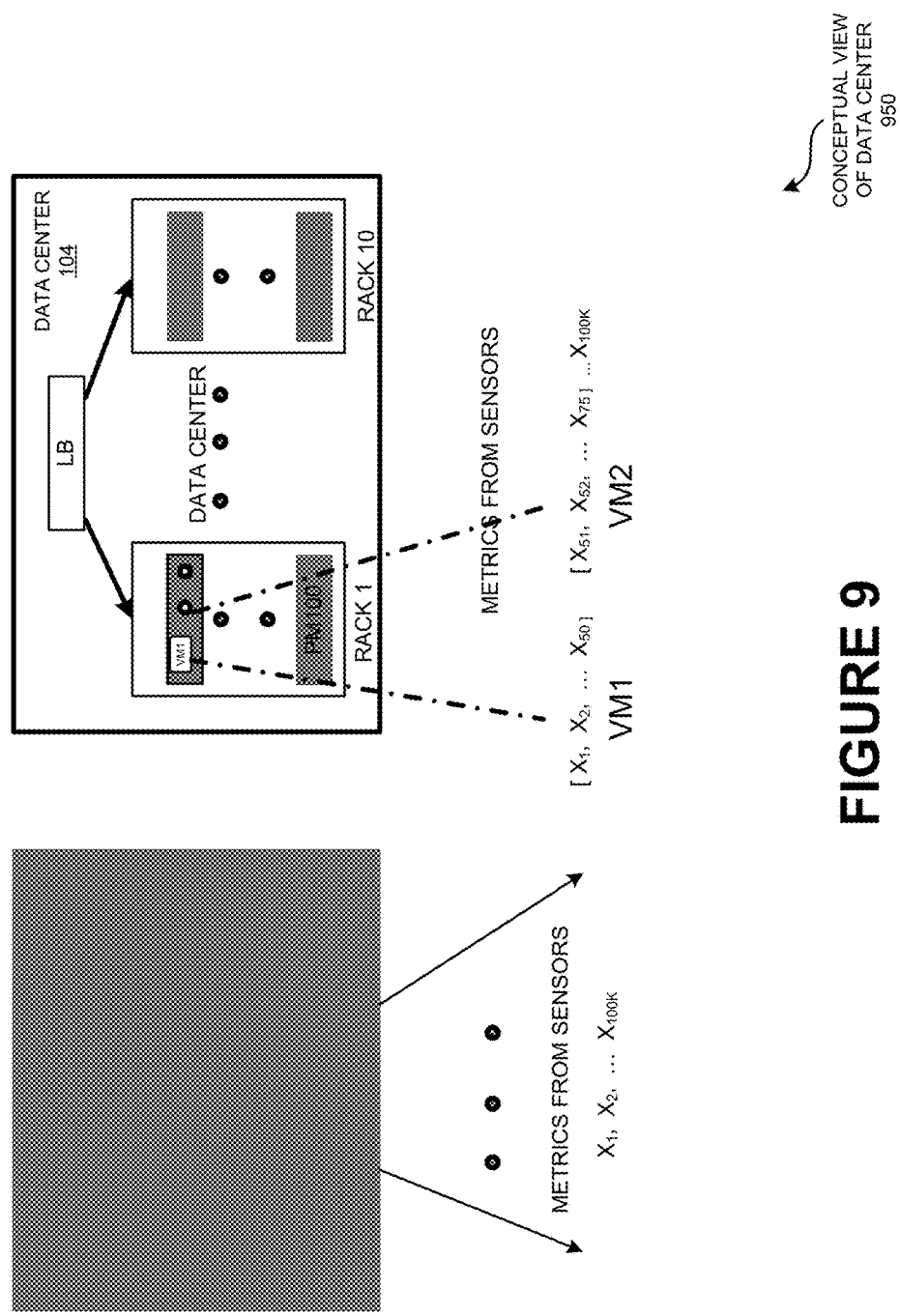
FIG. 9 is a conceptual view of data center illustrating various racks of data with the metrics generated from sensors of the data center of the computer server of FIG. 1, according to one embodiment.

FIG. 9 is a conceptual view 950 of data center illustrating various racks of data with the metrics generated from sensors of the data center of the computer server of FIG. 1, according to one embodiment.

Particularly, FIG. 9 illustrates an embodiment of a data center 104 used as a solution for data center modeling. The data may be stored in the form of metric(s) 142 and are placed together in racks (e.g., Rack 1, Rack 2, etc.). The data center modeling may include several steps, according to one embodiment. In one embodiment, the machine may collect the metric(s) 142 from sensors and may group them by components (e.g., VM1, VM2 . . . LB . . . ). The machine may build models for each component by using models to compress the metric(s) 142 to smaller number. Further the compressed metric(s) 142 of components may build sub models (e.g., PM . . . ), according to one embodiment.

These compressed sub-system specific metrics may be combined and may be compressed again. The user can also specify the sub system as a collection of metrics to monitor the behavior. The whole process may be repeated to build higher sub-system models (also known as Rack. E.g., Rack 1, Rack 2, etc.). On combining such higher sub-system models with each other the full system model (also known as data center) may be formed, according to one embodiment.

Figure 10:
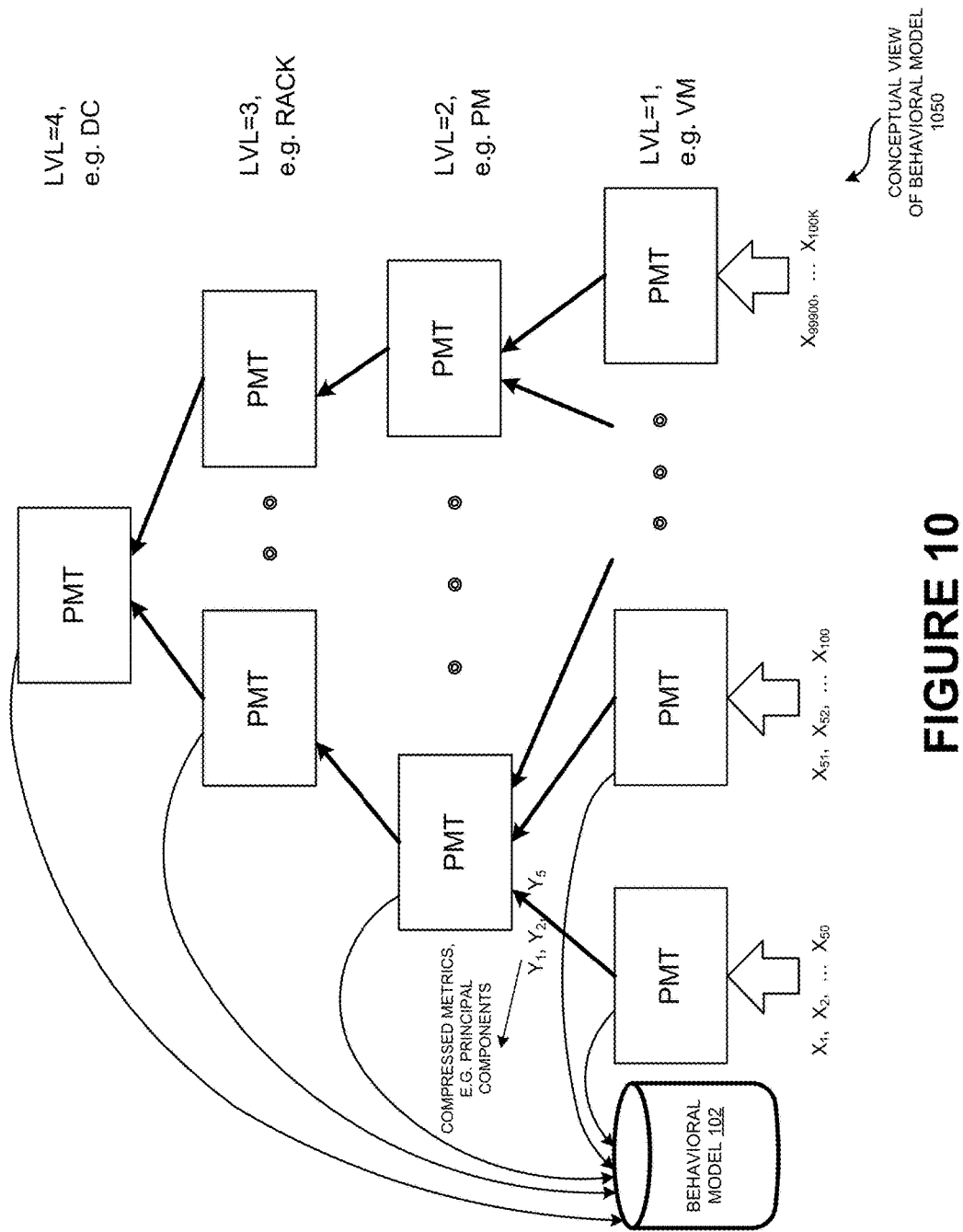
FIG. 10 is a conceptual view of behavior model of data center of FIG. 1 illustrating a model trainer conduct, according to one embodiment.

FIG. 10 is a conceptual view of behavior model 1050 of data center 104 of FIG. 1 illustrating a model trainer conduct, according to one embodiment.

Particularly, FIG. 10 illustrates a model trainer (a trainer kit) may include typical training machine learning algorithm(s) 106 which may further includes Principal Component Analysis (PCA) 302 and Artificial Neural Networks (ANN) 304, according to one embodiment. In an embodiment, the principal component analysis 302 may compute the principal components of the metric group representing a component and/or sub-system. The principal components may be truncated to eliminate noise (e.g., keep top N PCs, so that 90% of variance is retained).

In an embodiment, a trainer of the Artificial Neural Network (also known as neural network 304) may build an auto-associative NN with say, one hidden layer. The principal component analysis 302 model may include the input metrics to project to principal component space and the principal components may be truncated. The principal components obtained may be the output of the model. The truncated principal components may be projected back to the original metric space. The difference between original and the computed metrics (from the principal component analysis 302) may be used to predict anomalies, according to one embodiment.

Various embodiments of the systems and techniques described here can be realized in at least one of a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, and/or code) comprise machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computing device having a display device (e.g., a cathode ray tube ("CRT") and/or liquid crystal ("LCD") monitor) for displaying information to the user and a keyboard and a mouse 724 by which the user can provide input to the computer. Other kinds of devices can be used to provide for interaction with a user as well; for example, feedback provided to the user can be any form of sensory feedback (e.g., visual feedback, auditory feedback, and/or tactile feedback) and input from the user can be received in any form, including acoustic, speech, and/or tactile input.

The systems and techniques described here may be implemented in a computing system that comprises at least one of a back end component (e.g., as a data server), a middleware component (e.g., an application server), a front end component (e.g., a client computer having a graphical user interface, and/or a Web browser through which a user can interact with an embodiment of the systems and techniques described here), and a combination thereof. The components of the system may also be coupled through a communication network.

The communication network may comprise at least one of a local area network ("LAN") and a wide area network ("WAN") (e.g., the Internet). The computing system can comprise at least one of a client and a server. In one embodiment, the client and the server are remote from each other and interact through the communication network.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A method of a server, comprising:
grouping metrics of a data center collected through one or more sensors by a plurality of nodes in the data center;
generating a behavioral model of the data center when a machine learning algorithm is applied using a processor and a memory of the server,
wherein the behavioral model is structured based on an analysis of a team of human modelers that partition the data center into the plurality of nodes as a plurality of connected nodes, each node in the plurality of connected nodes representing an active electronic device attached to a computer network to which the server integrates by way of a machine learning environment, and the active electronic device being capable of sending, receiving, and forwarding information over a communication channel of the computer network,
wherein the each node is further decomposed by the team of human modelers into a connected set comprising at least one of a child node and a simple component,
wherein the child node is a node that is a subset of another node, and
wherein the simple component is a node that has not been further decomposed;
detecting an anomaly in a system behavior using the behavioral model of the data center by recursively applying, through the processor and the memory, the behavioral model to the each node and the simple component by:
generating a compressed metric vector for the each node by reducing a dimension of an input metric vector using at least one of: a principal component analysis and a neutral network, wherein the input metric vector comprises at least one of a metric for the each node and the compressed metric vector from the child node, and the input metric vector represents a multidimensional space in which a software component comprising a representation of the each node is defined with distinct coordinates; and
determining whether anomalous behavior is occurring in the each node by comparing the compressed metric vector with a compressed model vector,
wherein the compressed model vector of the each node is the compressed metric vector generated using at least one of the metric associated with the each node operating non-anomalously, the metric being a property of a route in the computer network capable of being any value used by a routing protocol to determine whether one particular route is preferable to another route;
determining a root cause of a failure caused by the detected anomaly, the root cause of the failure being an initiating cause of a causal chain leading to the detected anomaly;
proactively updating the behavioral model of the data center using the machine learning algorithm and an automatic recommendation of an action by an operator to resolve a problem caused by the failure; and
automatically updating a system model of the data center based on combining behavioral models for the plurality of connected nodes, and detection of a dynamic change from at least one of a creation, a destruction, and a modification of at least one of an interconnection and a flow in the data center based on a reapplication of a human knowledge to further enhance the machine learning algorithm, the interconnection referring to at least one of a modification, an adjustment and an alteration in a connection of the each node to attain a target result, and the flow referring to a pattern of processing an input to the system model to achieve the target result based on the behavioral model of the machine learning environment.

2. The method of claim 1:
wherein the team of human modelers identifies at least one characteristic comprising a label, a type, a category, and a connection of the each node, and
wherein the team of human modelers manually defines what constitutes a group of nodes having similar characteristics in the server.

3. The method of claim 1:
wherein the machine learning algorithm improves the behavioral model based on the human knowledge applied in real time as an input by the team of human modelers.

4. The method of claim 1, comprising:
automatically updating the system model of the data center based on the dynamic change detected when a node is at least one of added, deleted, and moved in the data center.

5. A method comprising:
grouping metrics of a data center collected through one or more sensors by subsystems of the data center;
generating a behavioral model of the data center when a machine learning algorithm is applied using a processor and a memory,
    wherein the behavioral model is trained based on a human knowledge deconstruction of the data center into a set of connected simplified components,
    wherein the behavioral model is generated based on an analysis of a team of human modelers that decomposes a system of the data center into the subsystems as a connected system of smaller constituent subsystems, a smaller constituent subsystem representing an active electronic device attached to a computer network to which the processor and the memory integrate by way of a machine learning environment, and the active electronic device being capable of sending, receiving and forwarding information over a communication channel of the computer network,
    wherein the smaller constituent subsystems are further decomposed by the team of human modelers into the set of connected simplified components,
    wherein the team of human modelers identify at least one characteristic comprising a label, a type, a category, a connection, and a metric of each of the smaller constituent subsystems, the metric being a property of a route in the computer network capable of being any value used by a routing protocol to determine whether one particular route is preferable to another route,
    wherein the team of human modelers groups the each of the smaller constituent subsystems having similar characteristics to enable the machine learning algorithm to learn a system behavior, and the system behavior being a set of parameters monitored based on the behavioral model, and
    wherein the machine learning algorithm continually improves the behavioral model based on a human knowledge applied in real time as an input by the team of human modelers;
detecting an anomaly in the system behavior based on the behavioral model of the data center;
determining a root cause of a failure caused by the detected anomaly, the root cause of the failure being an initiating cause of a causal chain leading to the detected anomaly;
compressing the metric of the each of the smaller constituent subsystems in a recursive fashion to ultimately build a system model of the data center at a point in time;
proactively updating the behavioral model of the data center using the machine learning algorithm and an automatic recommendation of an action by an operator to resolve a problem caused by the failure; and
automatically updating the system model of the data center based on detection of a dynamic change from at least one of a creation, a destruction and a modification of at least one of an interconnection and a flow in the data center based on a reapplication of the human knowledge to further enhance the machine learning algorithm, the interconnection referring to at least one of a modification, an adjustment and an alteration in a connection of the smaller constituent subsystem to attain a target result, and the flow referring to a pattern of processing an input to the system model to achieve the target result based on the behavioral model of the machine learning environment.

6. The method of claim 5, comprising:
automatically updating the system model of the data center based on the dynamic change detected when at least one of a smaller constituent subsystem and a connected simplified component is at least one of added, deleted, and moved in the data center.

7. A system of a machine learning environment comprising:
a computer server of the machine learning environment, the computer server including one or more computers having instructions stored thereon that when executed cause the one or more computers to:
    group metrics of a data center collected through one or more sensors by subsystems of the data center;
    generate a behavioral model of the data center when a machine learning algorithm is applied using a processor and a memory,
        wherein the behavioral model is generated based on analysis of a team of human modelers that decomposes a system of the data center into a connected system of smaller constituent subsystems, a smaller constituent subsystem representing an active electronic device attached to a computer network to which the processor and the memory integrate by way of the machine learning environment, and the active electronic device being capable of sending, receiving and forwarding information over a communication channel of the computer network,
    wherein the smaller constituent subsystems are further decomposed by the team of human modelers into a set of connected simplified components,
    wherein the behavioral model is trained based on a human knowledge deconstruction of the data center into the set of connected simplified components,
    wherein the team of human modelers identifies at least one characteristic comprising a label, a type, a category, a connection, and a metric of each of the smaller constituent subsystems, the metric being a property of a route in the computer network capable of being any value used by a routing protocol to determine whether one particular route is preferable to another route,
    wherein the team of human modelers groups the each of the smaller constituent subsystems having a similar characteristics to enable the machine learning algorithm to learn a system behavior, and the system behavior being a set of parameters monitored based on the behavioral model, and
    wherein the machine learning algorithm continually improves the behavioral model based on a human knowledge applied in real time as an input by the team of human modelers,
detect an anomaly in the system behavior based on the behavioral model of the data center, determine a root cause of a failure caused by the detected anomaly, the root cause of the failure being an initiating cause of a causal chain leading to the detected anomaly, proactively update the behavioral model of the data center using the machine learning algorithm and an automatic recommendation of an action by an operator to resolve a problem caused by the failure, compress the metric of the each of the smaller constituent subsystems in a recursive fashion to ultimately build a system model of the data center at a point in time, and automatically update the system model of the data center based on detection of a dynamic change from at least one of a creation, a destruction, and a modification of at least one of an interconnection and a flow in the data center based on a reapplication of the human knowledge to further enhance the machine learning algorithm, the interconnection referring to at least one of a modification, an adjustment and an alteration in a connection of the smaller constituent subsystem to attain a target result, and the flow referring to a pattern of processing an input to the system model to achieve the target result based on the behavioral model of the machine learning environment.

* * * * *